United States Patent
Koo Tze Mew

(10) Patent No.: US 10,102,558 B2
(45) Date of Patent: Oct. 16, 2018

(54) SMART DRESSING ROOMS

(71) Applicant: PAYPAL, INC., San Jose, CA (US)

(72) Inventor: Dennis Warren Koo Tze Mew, San Jose (CA)

(73) Assignee: PAYPAL, INC., San Jose, CA (US)

( * ) Notice: Subject to any disclaimer, the term of this patent is extended or adjusted under 35 U.S.C. 154(b) by 1261 days.

(21) Appl. No.: 14/192,764

(22) Filed: Feb. 27, 2014

(65) Prior Publication Data

US 2015/0170252 A1 Jun. 18, 2015

Related U.S. Application Data

(60) Provisional application No. 61/917,849, filed on Dec. 18, 2013.

(51) Int. Cl.
*G06Q 30/06* (2012.01)

(52) U.S. Cl.
CPC ..... *G06Q 30/0631* (2013.01); *G06Q 30/0639* (2013.01)

(58) Field of Classification Search
CPC .......................................... G06Q 30/06–30/08
USPC ................................................ 705/26.1–27.2
See application file for complete search history.

(56) References Cited

U.S. PATENT DOCUMENTS

| | | | |
|---|---|---|---|
| 2008/0015942 A1 | 1/2008 | Harper et al. | |
| 2008/0249865 A1* | 10/2008 | Angell | G06Q 30/02 705/14.34 |
| 2010/0265311 A1 | 10/2010 | Carpenter, Jr. et al. | |
| 2013/0030953 A1 | 1/2013 | Marsic, IV | |
| 2013/0254006 A1* | 9/2013 | Braun | G06Q 30/02 705/14.25 |
| 2014/0058880 A1* | 2/2014 | Konaxis | G06Q 30/0621 705/26.5 |

OTHER PUBLICATIONS

PCT Search Report, PCT/US2014/70972, dated Mar. 13, 2015.

* cited by examiner

*Primary Examiner* — Ethan D Civan
*Assistant Examiner* — Ming Shui
(74) *Attorney, Agent, or Firm* — Haynes and Boone, LLP

(57) ABSTRACT

Methods and systems for improving a shopping experience are described. A customer brings items of clothing to try on in a dressing room. The customer's exact location is provided to the store clerk with the assistance of a beacon located in the dressing room. The store clerk also knows the exact items the customer has brought into the dressing room because a reader in the dressing room reads tags associated with the items. The customer may be provided with information on suggested products, such as alternative or complementary items to the items the customer selected.

20 Claims, 3 Drawing Sheets

SMART DRESSING ROOMS

CROSS-REFERENCE TO RELATED APPLICATION

Pursuant to 35 U.S.C. § 119(e), this application claims priority to the filing date of U.S. Provisional Patent Application No. 61/917,849, filed Dec. 18, 2013, which is incorporated by reference in its entirety.

BACKGROUND

Field of the Invention

The present invention generally relates to improving a user's shopping experience.

Related Art

Retail stores try to increase sales and profits in various ways. Such ways include sales, coupons, advertisements and others. Retail stores spend many resources on focused advertisements or personalized approaches to customers. Such personalized approaches provide specific data to the customer according to known parameters, such as gender, age, address, previous purchases and the like. For example, email messages to the customer's email address or the customer's mobile device are sent by the retailer.

Despite these attempts, customers still have issues when they visit a store. For example, items are often not visible enough on the store shelves; other items, matching the ones the customer is looking for, are not noticed; customers do not like being addressed by the store personnel or are reluctant about asking themselves; and/or customers often cannot find adequate items by themselves. Thus, a need exists for systems and methods that improve the shopping experience and increase customer satisfaction.

Figure 1:
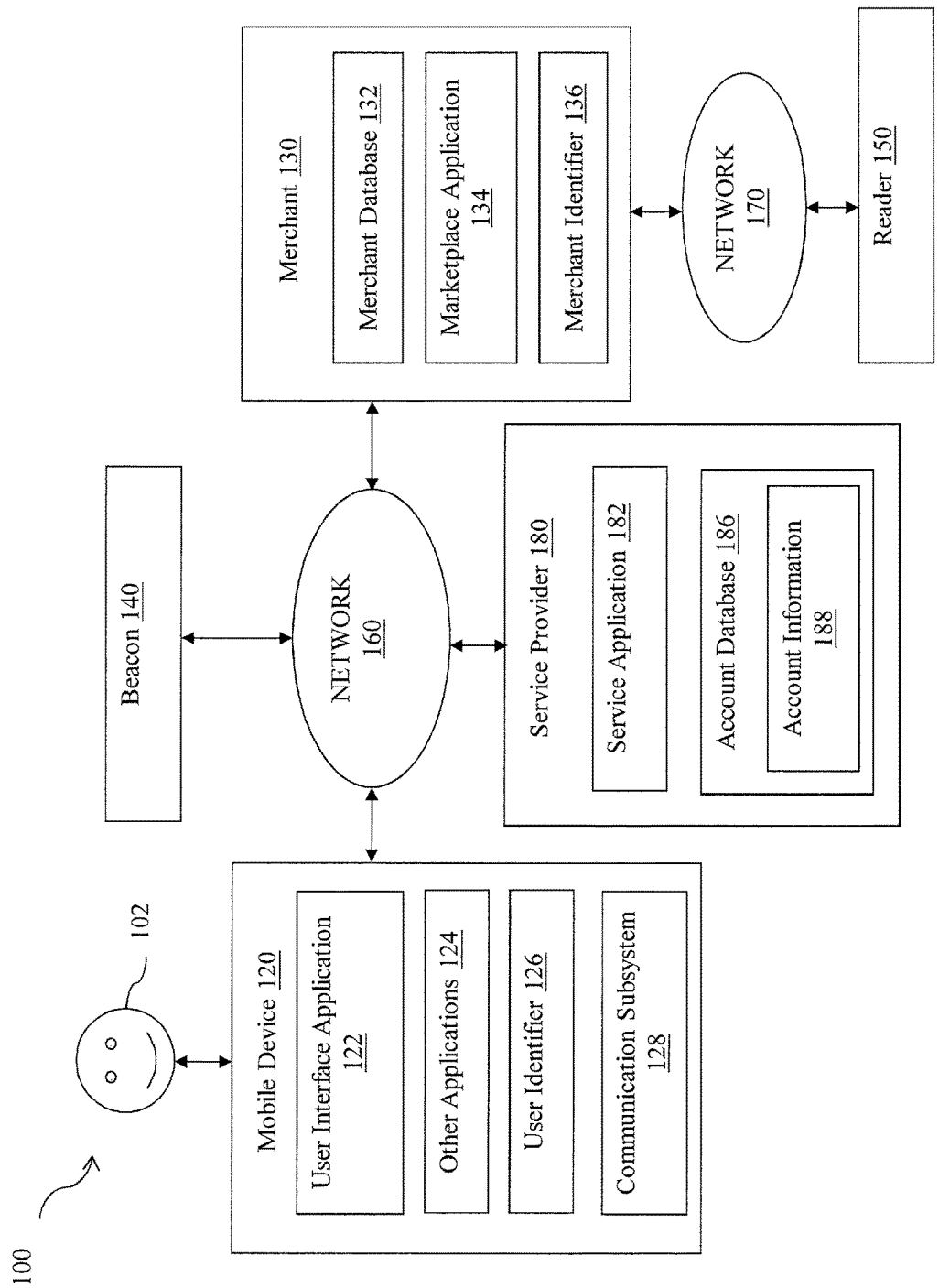
FIG. 1 is a block diagram illustrating a system for improving a shopping experience according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods that allow communication between a customer and a store clerk while the customer is in a dressing room. The customer's exact location is provided to the store clerk with the assistance of a beacon located in the dressing room. Moreover, the store clerk knows the exact items the customer has brought into the dressing room because a reader in the dressing room reads tags associated with the items. A better dressing room experience can translate to a bigger purchase and a boost in sales.

While the customer is in the dressing room, the system may provide information to the customer related to alternative or complementary items. The system may display a picture of the clothes in different colors and/or different styles on the user's mobile device. The system may also display and/or suggest accessories (e.g., a belt, shoes, pocketbook, scarf, etc.) that match the clothes selected by the customer. The system can display and/or suggest items that would be of interest to the specific customer, based on items previously selected by the customer. The customer is also able to take pictures and post the pictures to social media to share with friends or family.

FIG. 1 shows one embodiment of a block diagram of a network-based system 100 adapted to improve a shopping experience using a mobile device 120 over a network 160. As shown, system 100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

As shown in FIG. 1, the system 100 includes a mobile device 120 (e.g., a smartphone), a merchant server or device 130, a beacon 140 (e.g., a radio frequency beacon or Bluetooth Low Energy (BLE) beacon), a reader 150, and at least one service provider server or device 180 (e.g., network server device) in communication over the networks 160 and 170. The networks 160 and 170, in one embodiment, may each be implemented as a single network or a combination of multiple networks. For example, in various embodiments, the networks 160, 170 may include the Internet and/or one or more intranets, landline networks, wireless networks, and/or other appropriate types of communication networks. In another example, the networks 160, 170 may comprise a wireless telecommunications network (e.g., cellular phone network) adapted to communicate with other communication networks, such as the Internet.

The mobile device 120 is configured to perform one or more tasks when mobile device 120 is located in proximity to the beacon 130. The task to be performed can include, for example, launching an application program, setting certain files to non-accessible mode, initiating a phone call, sounding an alarm, storing a message, displaying a message, etc.

The mobile device 120, in various embodiments, may be implemented using any appropriate combination of hardware and/or software configured for wired and/or wireless communication over the network 160. The mobile device 120, in one embodiment, may be utilized by the user 102 to interact with the service provider server 180 over the network 160. For example, the user 102 may conduct financial transactions (e.g., account transfers, bill payment, etc.) with the service provider server 180 via the mobile device 120. In various implementations, the mobile device 120 may include a wireless telephone (e.g., cellular or mobile phone), a tablet, a personal digital assistant (PDA), a personal computer, a notebook computer, and/or various other generally known types of wired and/or wireless computing devices.

In some embodiments, the mobile device 120 includes a wearable computing device, such as a smartwatch or Google Glass®. A wearable computing device may be configured to allow visual perception of a real-world environment and to display computer-generated information related to the visual perception of the real-world environment. Advantageously, the computer-generated information may be integrated with a user's perception of the real-world environment. For example, the computer-generated information may supplement a user's perception of the physical world with useful computer-generated information or views related to what the user is perceiving or experiencing at a given moment.

The mobile device 120, in one embodiment, includes a user interface application 122, which may be utilized by the user 102 to conduct transactions (e.g., shopping, purchasing, bidding, etc.) with the merchant device 130 or the service provider server 180 over the network 160. In one aspect, purchase expenses may be directly and/or automatically debited from an account related to the user 102 via the user interface application 122.

In one implementation, the user interface application 122 comprises a software program, such as a graphical user interface (GUI), executable by a processor that is configured to interface and communicate with the service provider server 180 via the network 160. In another implementation, the user interface application 122 comprises a browser module that provides a network interface to browse information available over the network 160. For example, the user interface application 122 may be implemented, in part, as a web browser to view information available over the network 160.

In an example, the user 102 is able to access merchant websites via the one or more merchant servers 130 to view and select items for purchase, and the user 102 is able to purchase items from the one or more merchant servers 130 via the service provider server 180. Accordingly, in one or more embodiments, the user 102 may conduct transactions (e.g., purchase and provide payment for one or more items) from the one or more merchant servers 130 via the service provider server 180.

The mobile device 120, in various embodiments, may include other applications 124 as may be desired in one or more embodiments of the present disclosure to provide additional features available to user 102. In one example, such other applications 124 may include security applications for implementing client-side security features, calendar application, contacts application, location-based services application, programmatic client applications for interfacing with appropriate application programming interfaces (APIs) over the network 160, and/or various other types of generally known programs and/or software applications. In still other examples, the other applications 124 may interface with the user interface application 122 for improved efficiency and convenience.

The mobile device 120, in one embodiment, may include at least one user identifier 126, which may be implemented, for example, as operating system registry entries, cookies associated with the user interface application 122, identifiers associated with hardware of the mobile device 120, or various other appropriate identifiers. The user identifier 126 may include one or more attributes related to the user 102, such as personal information related to the user 102 (e.g., one or more user names, passwords, photograph images, biometric IDs, addresses, phone numbers, etc.) and banking information and/or funding sources (e.g., one or more banking institutions, credit card issuers, user account numbers, security data and information, etc.). In various implementations, the user identifier 126 may be passed with a user login request to the service provider server 180 via the network 160, and the user identifier 126 may be used by the service provider server 180 to associate the user 102 with a particular user account maintained by the service provider server 180.

In some embodiments, the mobile device 120 includes a communication subsystem 128, which can include radio frequency receivers and transmitters and/or optical (e.g., infrared) receivers and transmitters. The specific design and implementation of the communication subsystem 128 can depend on the communication network over which the mobile device 120 is intended to operate. For example, the mobile device 120 can include communication subsystems designed to operate over a Global System for Mobile Communication (GSM) network, a General Packet Radio Service (GPRS) network, an Enhanced Data Rates for Global Evolution (EDGE) network, a Wi-Fi or WiMax network, and a Bluetooth™ network.

The one or more merchant servers 130, in various embodiments, may be maintained by one or more business entities (or in some cases, by a partner of a business entity that processes transactions on behalf of business entities). Examples of businesses entities include merchant sites, resource information sites, utility sites, real estate management sites, social networking sites, etc., which offer various items for purchase and payment. In some embodiments, business entities may need registration of the user identity information as part of offering items to the user 102 over the network 160. As such, each of the one or more merchant servers 130 may include a merchant database 132 for identifying items for sale, which may be made available to the mobile device 120 for viewing and purchase by the user 102. In one or more embodiments, user 102 may complete a transaction such as purchasing the items via service provider server 180.

Each of the merchant servers 130, in one embodiment, may include a marketplace application 134, which may be configured to provide information over the network 160 to the user interface application 122 of the mobile device 120. For example, user 102 may interact with the marketplace application 134 through the user interface application 122 over the network 160 to search and view various items available for purchase in the merchant database 132.

Each of the merchant servers 130, in one embodiment, may include at least one merchant identifier 136, which may be included as part of the one or more items made available for purchase so that, e.g., particular items are associated with particular merchants. In one implementation, the merchant identifier 136 may include one or more attributes and/or parameters related to the merchant, such as business and banking information. In various embodiments, user 102 may conduct transactions (e.g., searching, selection, monitoring, purchasing, and/or providing payment for items) with each merchant server 130 via the service provider server 180 over the network 160.

A merchant website may also communicate (for example, using merchant server 130) with the service provider through service provider server 180 over network 160. For example, the merchant website may communicate with the service provider in the course of various services offered by the service provider to merchant website, such as payment intermediary between customers of the merchant website and the merchant website itself. For example, the merchant website may use an application programming interface (API) that allows it to offer sale of goods in which customers are allowed to make payment through the service provider, while user 102 may have an account with the service provider that allows user 102 to use the service provider for making payments to merchants that allow use of authentication, authorization, and payment services of service provider as a payment intermediary. The merchant website may also have an account with the service provider.

In various embodiments, the merchant database 132 also includes body profile/body shape information of the user 102, which may be based on past purchases made by the user 102. Body profile or body shape information is used classify the human shape into a category, for example, endomorph, ectomorph, or mesomorph, or straight, pear, spoon, oval, diamond, or hourglass.

In one embodiment, consumer image and sizing measurements from a body scan of the user 102 is used to determine the body type of the user 102. Body scanners are available in some malls and provide users with recommendations on size, style, and brands that fit their body type. This information can be passed on to merchants. Sizing measurements can also be obtained from the user directly (e.g., by user input) or indirectly (e.g., by user past purchases or by gifts received by the user from others).

The merchant database, in some embodiments, also includes how clothing inventory fits based on body profile. For example, the merchant may designate some pieces and styles of clothing as flattering or fitting well on a petite body profile, but not on someone with an athletic build. In another example, the merchant knows what size fits what body type. For instance, a merchant knows that since the user 102 has a straight body type, the user needs at least a size 4 swimsuit. The merchant database or another database may include information about sizing for a particular manufacturer. For example, a men's size M shirt for manufacturer A may be equivalent to a men's size L shirt for manufacturer B. Thus, information may include how a user's measurements or "true" size translate to sizes for different manufacturers.

Based on the user's body shape, and the size and/or style of the item the user 102 selects, the merchant can predict whether an item will fit well on the user 102, or if the item will be too big or small. The merchant can then anticipate that the user 102 will need a different size, and bring the user 102 the correctly sized item quickly.

Beacon 140 may be set up by merchants or individuals offering various items, such as products and/or services for sale. As defined herein, a "beacon" is a short range communication device having a known or fixed location that provides a signal that can be detected by mobile devices within a certain proximity of the beacon. An example of a beacon is a radio frequency (RF) beacon (e.g., Bluetooth™ low energy (BLE) beacon), infrared beacon or a radio frequency identifier (RFID) tag. For example, a BLE beacon can broadcast an RF signal that includes its position coordinates (e.g., latitude, longitude), which can be detected by a mobile device. In some implementations, the beacon can also advertise location based services provided by a beacon network. A beacon network encompasses a plurality of beacons in a geographic region.

Beacon 140 is typically maintained by one or more service providers. When user 102 comes in range of beacon 140, a mobile application on the mobile device 120 run by a service provider can wake up and connect to the beacon 140. Mobile device 120 can then receive messages from beacon 140. In some implementations, beacon 140 is a BLE beacon.

Beacon 140 can output a wireless signal that can be detected by mobile device 120 when mobile device 120 is within a certain proximity of the beacon 140. Beacon 140 may be a device that periodically or continuously transmits a signal, such as a short-distance wireless (e.g., BLE), medium distance wireless (e.g., Wi-Fi), and/or other electro, magnetic, and/or electro-magnetic transmissions. Power on beacon 140 can be adjusted to communicate only within a desired range, which may depend on intended message ranges. Mobile device 120 is configured to detect the transmitted signals from beacon 140, such that when mobile device 120 is located within the transmission range of beacon 140, the signal may be detected.

Reader 150 may include one or more devices or systems used to read tags included in merchandise. For example, reader 150 may include a RFID system/interface that is able to read an RFID tag or label included with merchandise brought into a dressing room. In this case, reader 150 may wirelessly read a tag or label included with merchandise as a customer enters a dressing room. In other implementations, reader 150 may include other types of wireless systems/interfaces, such as a near field communication (NFC) system/interface that is able to read NFC tags included with merchandise. In each case, reader 150 may be able to determine what merchandise a customer has without requiring human intervention. For example, reader 150 may wirelessly read tags on merchandise when the merchandise is in relatively close proximity (e.g., 1 foot to 20 feet) of reader 150. The term "tag" as used herein should be construed to include any type of identification associated with merchandise that may be wirelessly read by reader 150.

After reader 150 reads a tag or label on merchandise, identifying attributes of the merchandise (e.g., code, price, size, color, manufacturer, model name, etc.) are sent to the merchant server 130 via network 170. The merchant server 130 can then communicate this information to mobile device 120 via beacon 140.

The service provider server 180, in one embodiment, may be maintained by a transaction processing entity, which may provide processing for financial transactions and/or information transactions between the user 102, merchant server 130, and beacon 140. As such, the service provider server 180 includes a service application 182, which may be adapted to interact with the mobile device 120, merchant server 130, and/or beacon 140 over the network 160. In one example, the service provider server 180 may be provided by PayPal®, Inc., eBay® of San Jose, Calif., USA, and/or one or more financial institutions or a respective intermediary that may provide multiple point of sale devices at various locations to facilitate transaction routings between merchants and, for example, financial institutions.

The service provider server 180, in one embodiment, may be configured to maintain one or more user accounts and merchant accounts in an account database 186 each of which may include account information 188 associated with one or more individual users (e.g., user 102) and merchants. For example, account information 188 may include private financial information of user 102, such as one or more account numbers, passwords, credit card information, banking information, or other types of financial information, which may be used to facilitate financial transactions between user 102 and a merchant. In various aspects, the methods and systems described herein may be modified to accommodate users and/or merchants that may or may not be associated with at least one existing user account and/or merchant account, respectively.

In one implementation, the user 102 may have identity attributes stored with the service provider server 180, and user 102 may have credentials to authenticate or verify identity with the service provider server 180. User attributes may include personal information, banking information and/or funding sources. In various aspects, the user attributes may be passed to the service provider server 180 as part of a login, search, selection, purchase, and/or payment request, and the user attributes may be utilized by the service provider server 180 to associate user 102 with one or more particular user accounts maintained by the service provider server 180.

Figure 2:
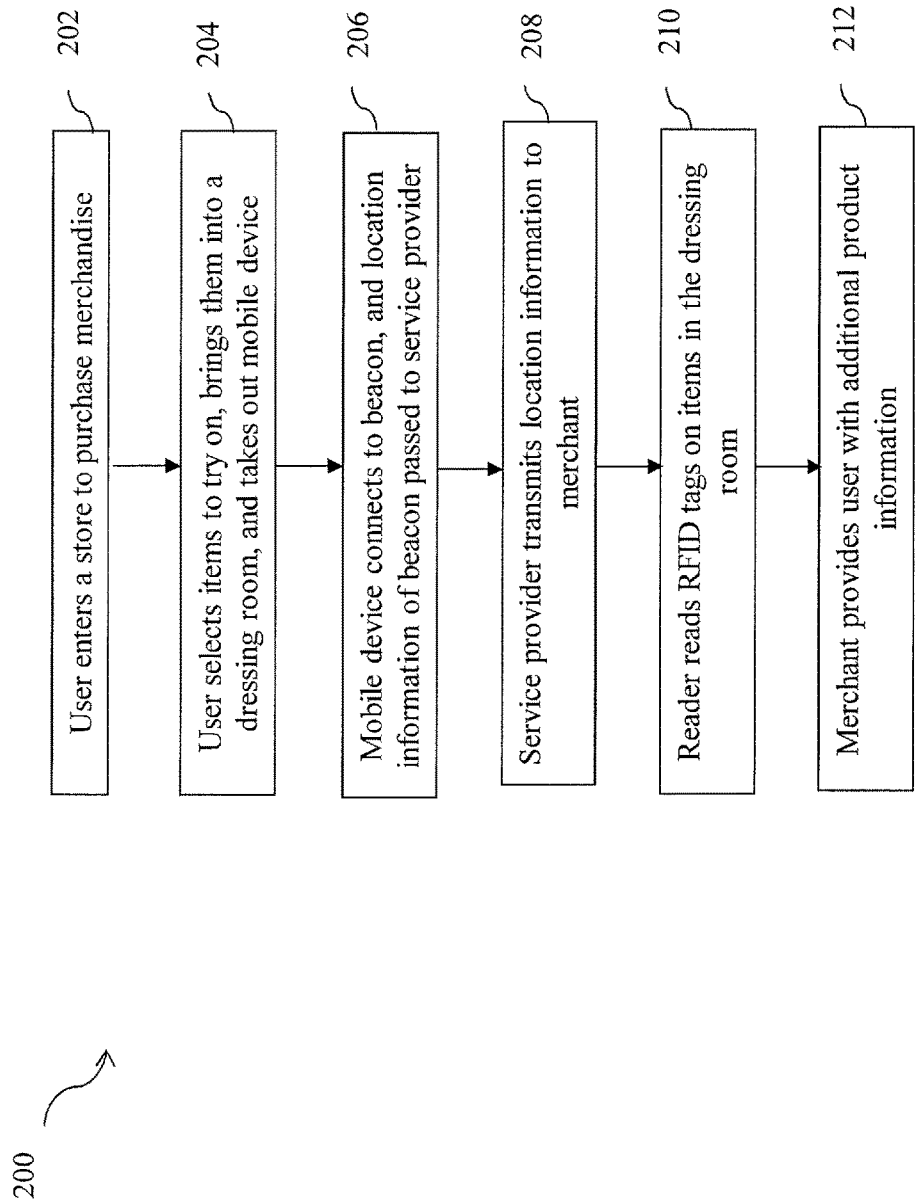
FIG. 2 is a flowchart showing a method for improving a shopping experience according to an embodiment of the present disclosure.

Referring now to FIG. 2, a flowchart 200 of a method for improving a shopping experience is illustrated according to an embodiment of the present disclosure. In an embodiment, at step 202, the user 102 enters a retail store to review and purchase goods or merchandise. User 102 carries mobile device 120 and uses mobile device 120 to communicate with the retail store and/or with a service provider.

In an embodiment, the retail store sells clothing or shoes. The clothing and/or shoes have RFID tags to facilitate inventory tracking. The RFID tags are capable of transmitting an information-bearing, RF signal (e.g., a signal that includes an identification number) in response to a tag interrogation signal from a RFID tag reader, e.g., reader 150. Readers, e.g., reader 150, are placed within each dressing room in the store to detect the presence of any RFID tags that are located within a detection range of the reader and to transmit tag identifying information for each detected RFID tag to merchant server 130. In addition, beacons, e.g., beacon 140, are placed at various locations inside the store, including dressing rooms, to detect the location of user 102.

At step 204, the user 102 selects one or more clothing items to try on, brings the items into a dressing room, and takes out his or her mobile device 120. At step 206, mobile device 120 makes a connection with beacon 140, and beacon 140 passes mobile device details (e.g., user identifier 126) to service provider server 180. The location information of beacon 140 is also sent to service provider server 180. The beacon associated with the dressing room senses user 102's presence by way of electronic communication with mobile device 120. As such, user 102's specific location inside the store (i.e., which dressing room) can be determined using beacon 140.

At step 208, the location of user 102 is transmitted to merchant server 130. In various embodiments, other details of user 102 (e.g., a user profile) can be passed to the merchant. The user profile can include information such as past purchases, size, age, gender, favorite color, body type, birthday, etc. Because the merchant knows which dressing room user 102 is occupying, store personnel need not knock on every dressing room door or call out the user's name to find and assist user 102 with his or her shopping experience. In this way, other shoppers are not disturbed and store employees do not waste time trying to find a shopper.

At step 210, reader 150 reads the RFID tags on the items in the dressing room to determine what items of clothing user 102 has selected and sends that information to the merchant. The merchant can use that information to provide a more personalized shopping experience to user 102. For example, the merchant may discover that the user 102 has brought a variety of little black dresses into the dressing room, and bring black dresses that are on sale or discounted to the user 102. In another example, user 102 may have selected patterned tops and bottoms, and the merchant can bring other patterned items (e.g., hats, socks, sunglasses, headbands, etc.) to the user 102.

At step 212, based on the identified items of clothing and the location of user 102, the merchant server 130 provides user 102 with additional product information on mobile device 120. In one embodiment, the merchant pushes information back to mobile device 120 via beacon 140. In another embodiment, the merchant pushes the information directly to mobile device 120. The product information is context-sensitive, tailored and personalized for user 102, as further described below.

For example, the RFID tags on merchandise can tell the merchant what size of clothing user 102 has. Before user 102 even starts trying on the clothes, he or she can check mobile device 120 to see if he or she has the correct size. If the clothing is an incorrect size, he or she can notify a store clerk, such as through mobile device 120, to obtain the right size and bring it to the dressing room because the merchant knows the exact dressing room of user 102. If a garment does not fit, user 102 may request that the clerk bring a different size to the dressing room. User 102 never has to leave the dressing room. By the time user 102 removes the original clothes, the clerk may have the new clothes waiting for user 102 to try on.

In one embodiment, the merchant knows, based on the body profile/body shape of the user 102, that the user 102 has brought the wrong size into the dressing room. Before the user 102 tries on the item or asks for a different size, an attendant can bring the right size of the item to the dressing room, making the user's time in the dressing room shorter. When the attendant knows that the item is not likely to fit, the attendant can quickly ask, "Do you need a different size?" The user 102 perceives faster and more efficient service.

In addition, because the merchant knows what kinds of items the user has brought into the dressing room, an attendant can provide more personalized service by saying something like, "How is that blouse fitting?" rather than a generic "How is that working for you?" The user 102 does not need to describe to the attendant what style or brand the blouse is because the attendant already knows. The user 102 is likely to appreciate this personalized and faster approach.

In another example, user 102 may receive suggested combinations, outfits, or additional items on mobile device 120 through beacon 140. In one embodiment, the items initially selected by user 102 are shown on mobile device 120, as well as their combination with other suggested items. The suggested items may provide an overview of other items best matching or complementary to the selected item in terms of functionality, style, design, and/or graphics. For example, if the user 102 selects a pair of pants, a suggested item may be the matching suit jacket, a pair of pumps, or a statement necklace. The user 102 may choose filters to narrow the suggested item to certain colors/color combinations, fabrics, patterns, occasions, styles, seasons, and the like.

In various embodiments, the mobile device 120 can send a message to store personnel to bring additionally selected items to the customer in a particular dressing room. The merchant can match the merchandise brought into the dressing room with complementary products, and market the complementary products to the customer in the privacy of the dressing room. This marketing approach is more focused and personal than general advertisements elsewhere in the store, because the advertisement is shared only with the customer in the changing room, where the customer can personally consider the products advertised without public concerns or pressures. The advertisements are based on the products that the customer has shown an interest in by taking the products into the dressing room.

In one embodiment, the suggested items include items that are similar in style or color to the selected item. For instance, imagine that the user 102 is trying on one shoulder bridesmaids dresses that are pale pink in color. Suggested items can include other one shoulder bridesmaid dresses that are a different shade of pink or that are a pale pastel color (e.g., pale blue, yellow, green, purple, etc.).

In a different embodiment, the suggested items include styles that were viewed or purchased by people who purchased the item selected by the user. For example, a shopper who selected a collared crewneck sweater may be directed to view other crewneck sweaters in the same design, or to pencil skirts that previous shoppers bought together with the crewneck sweater.

In yet another example, user 102 can post a picture of what he or she is wearing on a social networking website (e.g., Facebook, Twitter, Google+, Instagram, Flickr, etc.) and share the item. The merchant can automatically create a link to the individual pieces in the outfit because the merchant knows exactly what items of clothing user 102 has in the dressing room. When friends or family click on the link to each individual piece, the link takes them to the merchant website where the item is sold. They can then select and purchase the items.

The present disclosure describes systems and methods that improve the shopping experience of a customer at a physical store. Communication between the customer and a store employee can be made entirely or partially through the user mobile device, such that vocal interactions can be minimized or eliminated while the customer is in a dressing room. The methods and systems can provide better presentation of items that may not be readily noticeable or available, a boost in sales, a targeted personalized approach, fast response to customer demands, assistance in searching for items and combining them with other items, and faster and more efficient engagement of store personnel.

Figure 3:
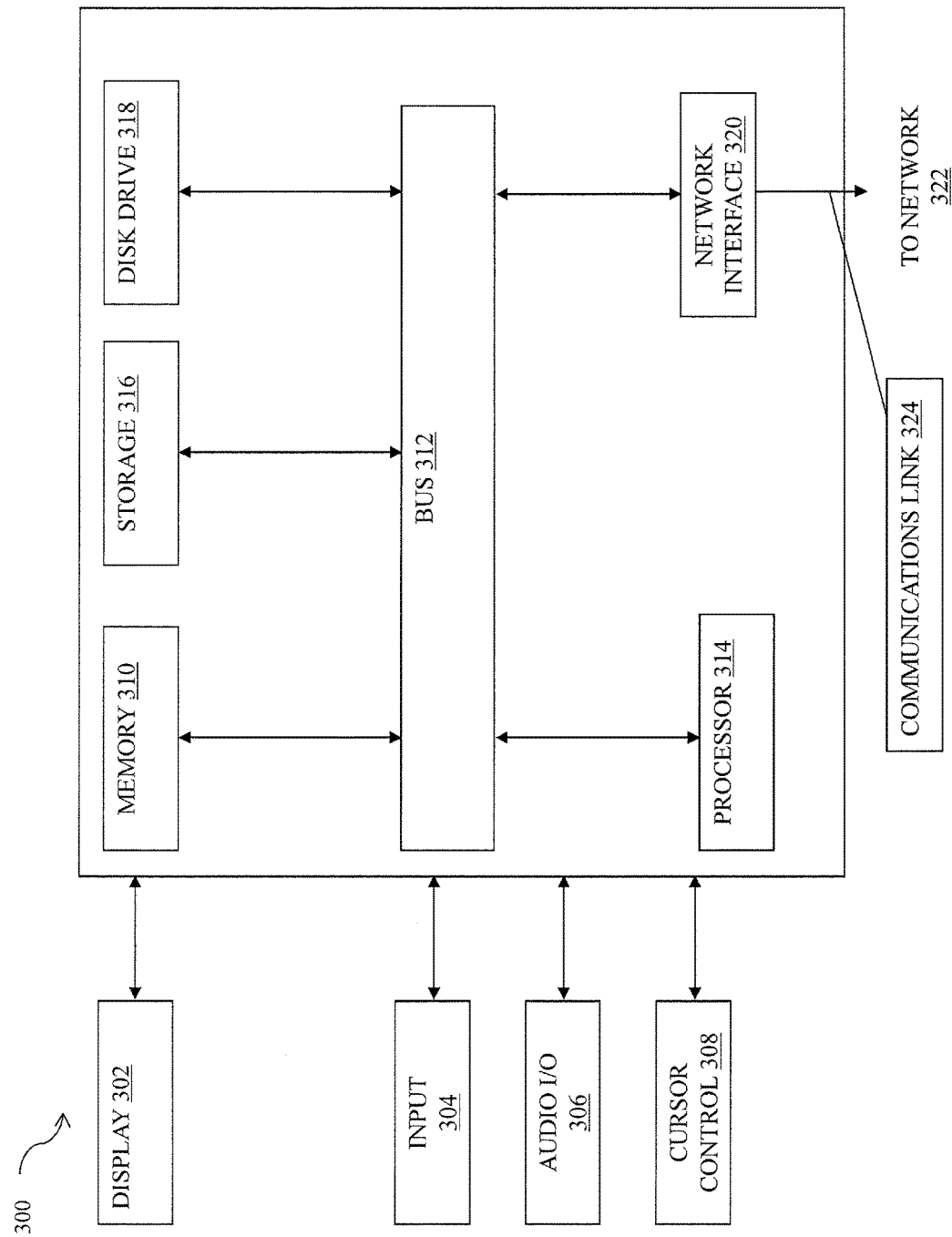
FIG. 3 is a block diagram of a system for implementing a device according to an embodiment of the present disclosure.

FIG. 3 is a block diagram of a computer system 300 suitable for implementing one or more embodiments of the present disclosure, including the mobile device 120, the merchant device or server 130, beacon 140, reader 150, and the service provider server 180. In various implementations, the mobile device 120, merchant device or server 130, beacon 140, and reader 150 may comprise a mobile cellular phone, personal computer (PC), laptop, PDA, etc. adapted for wireless communication, and the service provider server 180 may comprise a network computing device, such as a server. Thus, it should be appreciated that the devices 120, 130, 140, 150, and 180 may be implemented as computer system 300 in a manner as follows.

Computer system 300 includes a bus 312 or other communication mechanism for communicating information data, signals, and information between various components of computer system 300. Components include an input/output (I/O) component 304 that processes a user (i.e., sender, recipient, service provider) action, such as selecting keys from a keypad/keyboard, selecting one or more buttons or links, etc., and sends a corresponding signal to bus 312. I/O component 304 may also include an output component, such as a display 302 and a cursor control 308 (such as a keyboard, keypad, mouse, etc.). An optional audio input/output component 306 may also be included to allow a user to use voice for inputting information by converting audio signals. Audio I/O component 306 may allow the user to hear audio. A transceiver or network interface 320 transmits and receives signals between computer system 300 and other devices, such as another user device, a merchant server, or a service provider server via network 322. In one embodiment, the transmission is wireless, although other transmission mediums and methods may also be suitable. A processor 314, which can be a micro-controller, digital signal processor (DSP), or other processing component, processes these various signals, such as for display on computer system 300 or transmission to other devices via a communication link 324. Processor 314 may also control transmission of information, such as cookies or IP addresses, to other devices.

Components of computer system 300 also include a system memory component 310 (e.g., RAM), a static storage component 316 (e.g., ROM), and/or a disk drive 318. Computer system 300 performs specific operations by processor 314 and other components by executing one or more sequences of instructions contained in system memory component 310. Logic may be encoded in a computer readable medium, which may refer to any medium that participates in providing instructions to processor 314 for execution. Such a medium may take many forms, including but not limited to, non-volatile media, volatile media, and transmission media. In various implementations, non-volatile media includes optical or magnetic disks, volatile media includes dynamic memory, such as system memory component 310, and transmission media includes coaxial cables, copper wire, and fiber optics, including wires that comprise bus 312. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 300. In various other embodiments of the present disclosure, a plurality of computer systems 300 coupled by communication link 324 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
    a non-transitory memory; and
    one or more hardware processors coupled with the non-transitory memory and configured to read instructions from the non-transitory memory to cause the system to perform operations comprising:
        determining, based on a wireless electronic signal transmitted from a mobile device of a user and received by at least one beacon associated with a merchant store, that the mobile device of the user is located within a dressing room of the merchant store;
        in response to determining that the mobile device is located within the dressing room, sending a signal to the mobile device via the at least one beacon to launch an application in the mobile device and to cause the application to transmit a user identifier identifying the user wirelessly to the at least one beacon;
        establishing a communication channel between the application and a computing device associated with the merchant store via the at least one beacon;
        exchanging at least one message between the computing device and the application of the mobile device via the at least one beacon using the established communication channel;
        obtaining, from the at least one beacon, location information of the at least one beacon and the user identifier;
        accessing a user profile of the user based on the user identifier;
        identifying a first item of the merchant store brought into the dressing room based on a communication received from a radio frequency identifier (RFID) tag reader;
        receiving product information associated with the first item;
        transmitting, wirelessly via the at least one beacon to the mobile device, information related to a second item from the merchant store selected based on the product information associated with the first item and the user profile of the user; and
        causing the application to display the information related to the second item on the mobile device.

2. The system of claim 1, wherein the product information comprises attributes of the first item.

3. The system of claim 2, wherein the attributes comprise at least one of a code, a price, a size, or a color.

4. The system of claim 2, wherein the operations further comprise selecting the second item based on the attributes of the first item.

5. The system of claim 4, wherein the second item comprises at least one of a product that was viewed or purchased by a person who purchased the first item or a product that is within a style or color category of the first item.

6. The system of claim 1, wherein the operations further comprise:
    detecting that the user has generated a post comprising an image of the user wearing the first item on a networking website;
    in response to the detecting, generating a link for the first item based on the received product information, wherein the link is associated with a merchant website where the first item is offered for sale; and
    posting the link on the networking website.

7. The system of claim 1, wherein the operations further comprise in response to determining that the mobile device is located within the dressing room, activating a body scanner associated with the dressing room to obtain body measurement data of the user, wherein the second item is selected for the user further based on the obtained body measurement data.

8. The system of claim 1, wherein the operations further comprise causing the application of the mobile device to display the images of the first item in a plurality of different configurations.

9. The system of claim 8, wherein the plurality of different configurations comprises a plurality of different colors.

10. A method, comprising:
    determining, by one or more hardware processors based on a wireless electronic signal transmitted from a mobile device of a user and received by at least one beacon associated with a merchant store, that the mobile device of the user is located within a dressing room of the merchant store;
    in response to determining that the mobile device is located within the dressing room, sending, by the one or more hardware processors, a signal to the mobile device via the at least one beacon to launch an application in the mobile device and to cause the application to transmit a user identifier identifying the user wirelessly to the at least one beacon;
    establishing, by the one or more hardware processors, a communication channel between the application and a computing device associated with the merchant store via the at least one beacon to enable direct communications between the mobile device and the computing device;
    exchanging at least one message between the computing device and the application of the mobile device via the at least one beacon using the established communication channel;
    obtaining, by the one or more hardware processors from the at least one beacon, location information of the at least one beacon and the user identifier;
    accessing, by the one or more hardware processors, a user profile of the user based on the user identifier;
    identifying, by the one or more hardware processors, a first item of the merchant store brought into the dressing room based on a communication received from a radio frequency identifier (RFID) tag reader;

receiving, by the one or more hardware processors, product information associated with the first item;

transmitting, by the one or more hardware processors wirelessly via the at least one beacon to the mobile device, information related to a second item from the merchant store selected based on the product information associated with the first item and the user profile of the user; and causing, by the one or more hardware processors, the application to display the information related to the second item on the mobile device.

11. The method of claim 10, wherein the product information comprises attributes of the first item.

12. The method of claim 11, wherein the attributes comprise at least one of a code, a price, a size, or a color.

13. The method of claim 11, further comprising selecting the second item based on the attributes of the first item.

14. The method of claim 13, wherein the second item comprises at least one of a product that was viewed or purchased by a person who purchased the first item or a product that is within a style or color category of the first item.

15. The method of claim 10, further comprising:

detecting that the user has generated a post comprising an image of the user wearing the first item on a networking website; and in response to the detecting, posting a link associated with the first item based on the received product information on the networking website, wherein the link is associated with a merchant website where the first item is offered for sale.

16. A non-transitory machine-readable medium having stored thereon machine-readable instructions executable to cause a machine to perform operations comprising:

determining, based on a wireless electronic transmitted from a mobile device of a user and received by at least one beacon associated with a merchant store, that the mobile device of the user is located within a dressing room of the merchant store;

in response to determining that the mobile device is located within the dressing room, launching an application in the mobile device and to cause the application to transmit a user identifier identifying the user wirelessly to the at least one beacon;

establishing a communication channel between the application and a computing device associated with the merchant store via the at least one beacon to enable direct communications between the mobile device and the computing device;

exchanging at least one message between the computing device and the application of the mobile device via the at least one beacon using the established communication channel;

obtaining, from the at least one beacon, location information of the at least one beacon and the user identifier;

accessing a user profile of the user based on the user identifier;

identifying a first item of the merchant store brought into the dressing room based on a communication received from a radio frequency identifier (RFID) tag reader;

receiving product information associated with the first item transmitting, wirelessly via the at least one beacon to the mobile device, information related to a second item from the merchant store selected based on the product information associated with the first item and the user profile of the user; and causing the application to display the information related to the second item on the mobile device.

17. The non-transitory machine-readable medium of claim 16, wherein the product information comprises attributes of the first item.

18. The non-transitory machine-readable medium of claim 17, wherein the operations further comprise selecting the second item based on the attributes of the first item.

19. The non-transitory machine-readable medium of claim 17, wherein the attributes comprise at least one of a code, a price, a size, or a color.

20. The non-transitory machine-readable medium of claim 18, wherein the second item comprises at least one of a product that was viewed or purchased by a person who purchased the first item or a product that is within a style or color category of the first item.

* * * * *